(12) United States Patent
Lin et al.

(10) Patent No.: US 8,292,214 B2
(45) Date of Patent: Oct. 23, 2012

(54) VIBRATION DAMPING FOR WING-TO-BODY AIRCRAFT FAIRING

(75) Inventors: Juhn-Shyue Lin, Renton, WA (US); Herbert L. Hoffman, Seattle, WA (US); Gary R. Chewning, Woodinville, WA (US); Melvin Kosanchick, III, Woodinville, WA (US); Hugh Poling, Seattle, WA (US)

(73) Assignee: The Boeing Company, Chicago, IL (US)

( * ) Notice: Subject to any disclaimer, the term of this patent is extended or adjusted under 35 U.S.C. 154(b) by 779 days.

(21) Appl. No.: 12/395,648

(22) Filed: Feb. 28, 2009

(65) Prior Publication Data
US 2009/0184200 A1    Jul. 23, 2009

Related U.S. Application Data

(63) Continuation-in-part of application No. 12/016,741, filed on Jan. 18, 2008, now Pat. No. 8,056,850.

(51) Int. Cl.
*B64C 1/40* (2006.01)

(52) U.S. Cl. .......................... 244/1 N; 244/119; 181/292

(58) Field of Classification Search .................. 244/1 N, 244/117 R, 119, 130, 133; 181/292–294; 428/116–117
See application file for complete search history.

(56) References Cited

U.S. PATENT DOCUMENTS

| | | | |
|---|---|---|---|
| 3,976,269 A | 8/1976 | Gupta | |
| 4,557,961 A * | 12/1985 | Gorges | 428/117 |
| 4,635,882 A | 1/1987 | SenGupta et al. | |
| 4,674,712 A * | 6/1987 | Whitener et al. | 244/119 |
| 4,687,691 A | 8/1987 | Kay | |
| 4,828,202 A | 5/1989 | Jacobs et al. | |
| 5,365,842 A | 11/1994 | Panossian | |
| 5,542,626 A * | 8/1996 | Beuck et al. | 244/119 |
| 5,775,049 A | 7/1998 | Fricke | |
| 5,820,348 A | 10/1998 | Fricke | |
| 5,851,626 A | 12/1998 | McCorry et al. | |
| 5,876,023 A | 3/1999 | Hain et al. | |
| 5,895,013 A * | 4/1999 | Towfiq | 244/119 |
| 5,924,261 A | 7/1999 | Fricke | |
| 6,065,717 A | 5/2000 | Boock | |
| 6,179,086 B1 * | 1/2001 | Bansemir et al. | 181/292 |
| 6,220,388 B1 | 4/2001 | Sanborn | |
| 6,237,302 B1 | 5/2001 | Fricke | |
| 6,237,602 B1 | 5/2001 | Nickels et al. | |
| 6,267,838 B1 * | 7/2001 | Saugnac et al. | 181/292 |
| 6,547,049 B1 | 4/2003 | Tomlinson | |
| 6,595,509 B2 | 7/2003 | Sesek | |
| 6,609,592 B2 | 8/2003 | Wilson | |

(Continued)

FOREIGN PATENT DOCUMENTS

JP    11044015    2/1997

OTHER PUBLICATIONS

H.V. Panossian, "Structural Damping Enhancement Via Non-Obstructive Patricie Damping Technique", Journal of Vibration and Acoustics, p. 101-104.

(Continued)

*Primary Examiner* — Christopher P Ellis
(74) *Attorney, Agent, or Firm* — Yee & Associates, P.C.

(57) ABSTRACT

A wing-to-body fairing for aircraft is formed from a sandwich structure having integrated vibration damping.

22 Claims, 8 Drawing Sheets

U.S. PATENT DOCUMENTS

| | | | |
|---|---|---|---|
| 6,736,423 B2 | 5/2004 | Simonian et al. | |
| 6,851,515 B2 * | 2/2005 | Dussac et al. | 181/292 |
| 6,920,958 B2 | 7/2005 | Harrison | |
| 6,983,821 B2 * | 1/2006 | Putt et al. | 181/294 |
| 7,407,135 B2 | 8/2008 | Rouyre | |
| 7,419,031 B2 | 9/2008 | Liguore et al. | |
| 8,056,850 B2 | 11/2011 | Lin et al. | |
| 2002/0166721 A1 | 11/2002 | Monson et al. | |
| 2005/0194210 A1 | 9/2005 | Panossian | |
| 2006/0065784 A1 * | 3/2006 | Rouyre | 244/119 |
| 2008/0277057 A1 | 11/2008 | Montgomery et al. | |
| 2009/0184206 A1 | 7/2009 | Lin et al. | |

OTHER PUBLICATIONS

USPTO Office Action regarding U.S. Appl. No. 10/795,707, dated Jul. 24, 2006, 13 pages.

USPTO Final Office Action regarding U.S. Appl. No. 10/795,707, dated Nov. 2, 2006, 13 pages.

USPTO Final Office Action regarding U.S. Appl. No. 10/795,707, dated Sep. 28, 2007, 10 pages.

Appeal Brief regarding U.S. Appl. No. 10/795,707, dated Dec. 12, 2007, 33 pages.

Response to Notice of Non-Compliant Appeal Brief regarding U.S. Appl. No. 10/795,707, dated Jan. 7, 2008, 74 pages.

USPTO Official Communication regarding U.S. Appl. No. 10/795,707, dated Apr. 15, 2008, 3 pages.

Reply Brief regarding U.S. Appl. No. 10/795,707, dated May 21, 2008, 6 pages.

Response to Notice of Non-Compliant Appeal Brief regarding U.S. Appl. No. 10/795,707, dated Feb. 17, 2009, 5 pages.

USPTO Decision on Appeal regarding U.S. Appl. No. 10/795,707, dated Dec. 18, 2010, 6 pages.

USPTO Office Action regarding U.S. Appl. No. 12/016,741, dated Sep. 14, 2010, 6 pages.

USPTO Final Office Action regarding U.S. Appl. No. 12/016,741, dated Mar. 21, 2011, 9 pages.

USPTO Notice of Allowance regarding U.S. Appl. No. 12/016,741, dated Aug. 12, 2011, 7 pages.

Non-Obstructive Particle Damping (NOPD) Treatment Optimization for Composite Honeycomb Panels, 48$^{th}$ AIAA/ASME/ASCE/AHS/ASC Structures, Structural Dynamics, and Materials Conference Apr. 23-26, 2007, Honolulu, Hawaii.

H.V. Panossian, "Structural Damping Enhancement Via Non-Obstructive Patricie Damping Technique", Journal of Vibration and Acoustics, p. 101-105, vol. 114, Jan. 1992.

Papalou, A. and Masri S.F., "Response of Impact Dampers with Granular Materials Under Random Excitation", Earthquake Engineering and Structural Dynamics, p. 253-267, (Apr. 15, 1996).

Peeters, et al. Fuel *Efficiency of Commercial Aircraft: An Overview of Historical and Future Trends*, National Aerospace Laboratory report of The Netherlands, NLR-CR-2005-669 (Nov. 2005).

* cited by examiner

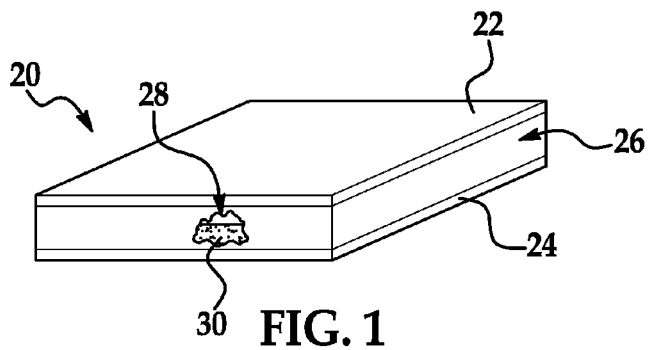
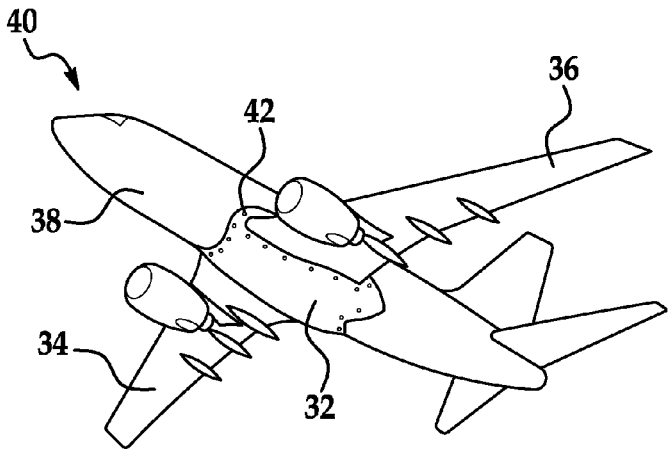
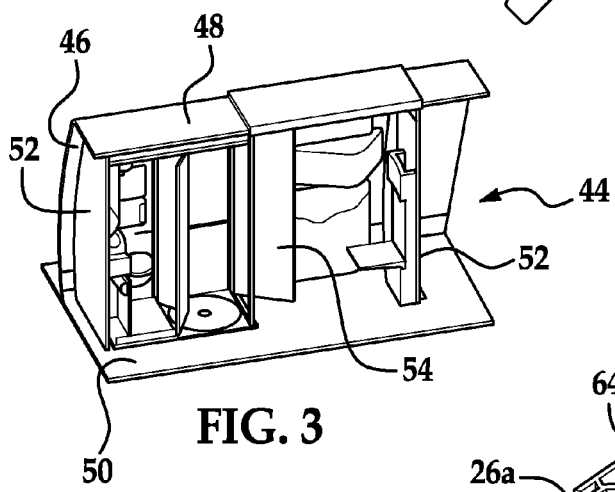
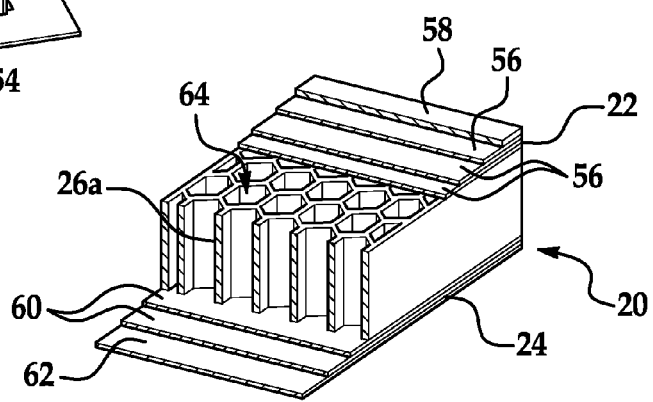

| Test Sequence | Panel Name | Description | Configuration | core depth | Weight(lb)/ surface density (lb/ft^2) |
|---|---|---|---|---|---|
| 1 | Panel 4 | baseline | | 0.35" | 12.5/0.50 |
| 2 | Panel 3 | baseline + 1x foam | | 0.35" | 20/0.80 |
| 3 | Panel PD1 | baseline + 1x particle damper | | 0.35" | 15.5/0.62 |
| 4 | Panel PD2 | 2x core + 2x particle damper | | 0.7" | 23.5/0.94 |
| 5 | Panel 5 | 2x core | | 0.7" | 17.5/0.70 |
| 6 | Panel 2 | 2x core + 1x foam | | 0.7" | 23.5/0.94 |
| 7 | Panel 1 | 2x core + 2x foam | | 0.7" | 34/1.36 |
| 8 | Panel 6 | 2x core + 1x foam+ 2x face sheet | | 0.7" | 30/1.20 |
| 9 | Panel 7 | 2x core + 2x foam+ 2x face sheet | | 0.7" | 40.5/1.62 |

FIG. 10

| Frequency (Hz.) | Panel 1 (2x + 2 foam) | Panel 2 (2x + 1 foam) | Panel 3 (1x + 1 foam) | Panel 4 (baseline) | Panel 5 (2x) | Panel PD1 (1x + 1 particle) | Panel PD2 (2x + 2 particle) | Panel 6 (2X + 1 Foam + 2 x face) | Panel 7 (2X + 2 Foam + 2 x Skin) |
|---|---|---|---|---|---|---|---|---|---|
| 100 | 19.6 | 18.6 | 12.2 | 13.0 | 10.8 | 9.1 | 17.1 | 17.1 | 21.6 |
| 125 | 12.8 | 17.9 | 11.6 | 5.9 | 10.8 | 8.3 | 15.6 | 17.1 | 20.0 |
| 160 | 16.5 | 11.9 | 13.2 | 8.0 | 11.7 | 9.8 | 14.1 | 17.5 | 19.2 |
| 200 | 15.9 | 15.1 | 14.6 | 8.6 | 10.3 | 11.1 | 14.2 | 16.9 | 18.9 |
| 250 | 19.1 | 16.0 | 15.7 | 10.2 | 11.8 | 12.5 | 15.9 | 18.4 | 20.2 |
| 315 | 20.4 | 17.3 | 17.9 | 12.4 | 12.6 | 15.7 | 18.5 | 20.0 | 23.6 |
| 400 | 22.8 | 19.0 | 18.8 | 12.7 | 13.2 | 15.8 | 18.6 | 20.1 | 23.3 |
| 500 | 24.3 | 19.5 | 19.8 | 13.9 | 14.2 | 17.3 | 19.8 | 21.5 | 24.2 |
| 630 | 25.8 | 20.6 | 21.6 | 15.9 | 14.2 | 19.1 | 22.0 | 21.2 | 25.7 |
| 800 | 26.6 | 20.7 | 22.3 | 15.9 | 12.8 | 20.0 | 22.8 | 17.4 | 25.6 |
| 1000 | 26.2 | 20.3 | 23.8 | 16.9 | 11.5 | 20.6 | 23.3 | 17.0 | 25.2 |
| 1250 | 27.0 | 19.1 | 25.5 | 17.6 | 12.5 | 20.9 | 23.0 | 16.8 | 24.1 |
| 1600 | 26.3 | 18.3 | 25.7 | 15.9 | 13.7 | 19.9 | 22.0 | 18.2 | 23.7 |
| 2000 | 25.9 | 18.9 | 26.8 | 14.9 | 16.1 | 19.4 | 23.3 | 20.3 | 24.5 |
| 2500 | 26.4 | 20.7 | 28.0 | 16.1 | 18.0 | 20.2 | 25.7 | 22.8 | 26.7 |
| 3150 | 27.8 | 22.3 | 27.7 | 17.1 | 19.7 | 21.0 | 27.5 | 25.9 | 28.7 |
| 4000 | 30.1 | 25.2 | 28.8 | 19.3 | 21.8 | 22.9 | 30.0 | 28.8 | 31.6 |
| 5000 | 33.4 | 28.8 | 30.8 | 22.1 | 24.5 | 25.7 | 32.3 | 32.0 | 35.3 |
| 6300 | 37.3 | 32.9 | 33.4 | 25.2 | 28.1 | 27.8 | 34.7 | 36.2 | 39.3 |
| 8000 | 41.4 | 36.3 | 35.2 | 27.9 | 30.8 | 29.4 | 36.4 | 41.6 | 43.0 |
| 10000 | 43.0 | 38.4 | 36.8 | 28.9 | 32.7 | 29.6 | 36.4 | 43.8 | 44.7 |

| Center Freq (Hz) | Panel 1 | Panel 2 | Panel 3 | Panel 4 | Panel 5 | Panel PD1 | Panel PD 2 | Panel 6 | Panel 7 |
|---|---|---|---|---|---|---|---|---|---|
| 250 | 0.01 | 0.01 | 0.01 | 0.01 | 0.02 | 0.02 | 0.02 | 0.01 | 0.03 |
| 315 | 0.01 | 0.01 | 0.01 | 0.01 | 0.01 | 0.02 | 0.02 | 0.01 | 0.02 |
| 400 | 0.01 | 0.01 | 0.01 | 0.01 | 0.02 | 0.04 | 0.03 | 0.01 | 0.02 |
| 500 | 0.01 | 0.01 | 0.01 | 0.01 | 0.01 | 0.03 | 0.03 | 0.01 | 0.03 |
| 635 | 0.01 | 0.02 | 0.02 | 0.01 | 0.02 | 0.07 | 0.03 | 0.01 | 0.03 |
| 800 | 0.02 | 0.02 | 0.02 | 0.01 | 0.02 | 0.07 | 0.10 | 0.01 | 0.03 |
| 1000 | 0.02 | 0.02 | 0.02 | 0.01 | 0.02 | 0.07 | 0.08 | 0.02 | 0.04 |
| 1250 | 0.02 | 0.02 | 0.02 | 0.02 | 0.02 | 0.04 | 0.06 | 0.03 | 0.05 |
| 1600 | 0.02 | 0.02 | 0.03 | 0.01 | 0.03 | 0.03 | 0.02 | 0.02 | 0.05 |
| 2000 | 0.01 | 0.02 | 0.03 | 0.02 | 0.03 | 0.06 | 0.05 | 0.02 | 0.03 |
| 2500 | 0.02 | 0.02 | 0.02 | 0.02 | 0.02 | 0.02 | 0.04 | 0.02 | 0.03 |
| 3050 | 0.01 | 0.01 | 0.03 | 0.01 | 0.01 | 0.01 | 0.02 | 0.01 | 0.03 |
| 4000 | 0.03 | 0.02 | 0.03 | 0.01 | 0.02 | 0.02 | 0.02 | 0.02 | 0.01 |
| 5000 | 0.02 | 0.02 | 0.03 | 0.01 | 0.00 | 0.02 | 0.01 | 0.02 | 0.01 |
| 6300 | 0.02 | 0.01 | 0.03 | 0.01 | 0.02 | 0.02 | 0.04 | 0.01 | 0.01 |
| 8000 | 0.01 | 0.00 | 0.02 | 0.01 | 0.00 | 0.01 | 0.03 | 0.01 | 0.01 |

FIG. 12

VIBRATION DAMPING FOR WING-TO-BODY AIRCRAFT FAIRING

CROSS REFERENCE TO RELATED APPLICATIONS

This application is related to U.S. patent application Ser. No. 10/795,707 filed Mar. 8, 2004 and published as U.S Patent Application Publication No. 2005/0194210 A1 on Sep. 8, 2005, status abandoned, and is a continuation-in-part of U.S. patent application Ser. No. 12/016,741, filed on Jan. 18, 2008, now issued as U.S. Pat. No. 8,056,850, both of which applications are incorporated by reference herein in their entireties.

TECHNICAL FIELD

This disclosure generally relates to the reduction of noise and vibration in structures, and deals more particularly with a panel sandwich construction useful in reducing the transmission of noise and vibration in aircraft and aerospace vehicles.

BACKGROUND

Noise and vibration onboard aircraft can be discomforting to passengers and may stress aircraft components, resulting in fatigue. Various techniques have been used in aircraft industry to reduce noise and vibration, including the use of viscoelastic or rubber-like, add-on tape or patches. These patches, which may be adhesively applied to certain aircraft components, flex when excited by vibrations, thereby dissipating vibrational energy by converting this energy into heat. The use of viscoelastic patches may have a number of disadvantages in some applications. For example, these patches add weight to the aircraft and their effectiveness may be diminished at certain frequencies and temperatures. Moreover, the effectiveness of viscoelastic patches may degrade over time, and they may not be suitable for use in certain areas of the aircraft.

Accordingly, there is a need for improved techniques for vibration damping in aircraft components which are effective over a wide range of frequencies and temperatures and do not add material weight to the aircraft. There is also a specific need for a wing-to-body fairing that is provided with vibration damping in order to reduce cabin noise.

SUMMARY

The disclosed embodiments may reduce noise and vibration in aircraft by integrating vibration damping features into aircraft components, such as a wing-to-body fairing. In one exemplary embodiment, a wing-to-body fairing is formed from a composite sandwich structure comprising a honeycomb core sandwiched between composite laminate skins. Vibration damping is achieved by at least partially filling open cells of the honeycomb core with a damping foam and/or individual damping particles that attenuate vibrations generated by air flow over the aircraft and/or engine operation. One of the skins may include a facesheet impregnated with a damping resin in order to enhance dissipation of vibrational energy in the fairing.

According to one disclosed embodiment, a structural panel includes vibration damping. The panel includes a structural core sandwiched between first and second facesheets. The core includes a cavity containing a vibration damping foam for reducing vibration by the panel. The core may include honeycomb cells that are at least partially filled with the damping foam. The panel may further include vibration damping particles within the cavity for further reducing panel vibration. Optionally, one of the facesheets may be impregnated with a highly damped epoxy resin for further enhancing dissipation of vibrational energy. The panel may be configured to form a wing-to-body fairing of an aircraft.

According to another disclosed embodiment, a vibration damped aircraft fairing is provided. The fairing includes a honeycomb core sandwiched between first and second skins. The core includes cells defining a plurality of cavities containing a vibration damping filler for damping vibrations in the fairing. The filler may include at least one of a foam and a plurality of individual particles moveable when vibrated to dissipate vibrational energy within the fairing. The dampening filler may fill approximately 60 to 90 percent of the volume of the cells. In one embodiment, the dampening filler may include both the foam and the individual particles. The individual particles may include at least one of volcanic ash, plastic, perlite, sodium-potassium, and aluminum-silicate. The individual particles may each have a size in the range of a approximately 1 to 300 microns.

According to a disclosed method embodiment, noise in an aircraft cabin caused by vibration of a wing-to-body fairing may be reduced. The method includes providing a cavity within the fairing and introducing a vibration damping filler into the cavity for dissipating vibrational energy in the fairing. The cavity may be provided by sandwiching an open cell honeycomb core between two skins. The filler may be introduced into the cavity by partially filling the cells of the honeycomb with at least one of a vibration damping foam and a plurality of individual damping particles.

The disclosed embodiments satisfy the need for improved vibration damping in aircraft components which is effective over a wide range of frequencies and ambient conditions, and which is both lightweight and may easily be integrated into the components.

These and other features, aspects and advantages of the disclosure will become better understood with reference to the following drawings, description and claims.

BRIEF DESCRIPTION OF THE ILLUSTRATIONS

FIG. 1 is a perspective view of a sandwich structure in the form of a panel having integrated vibration damping.

FIG. 2 is a bottom perspective view of an airplane having a wing-to-body fairing utilizing the sandwich structure shown in FIG. 1.

FIG. 3 is a perspective illustration, partially in section, of a cabin forming part of the aircraft shown in FIG. 2, and illustrating other components that may use the sandwich structure shown in FIG. 1.

FIG. 4 is a perspective view illustrating one form of the sandwich structure shown in FIG. 1 which employs a honeycomb core.

FIG. 10 is a matrix illustrating details of panel sandwich structures test to measure the effectiveness of various types of vibration damping.

FIG. 12 is a table illustrating the results of tests performed on the panels listed in FIG. 11, illustrating the damping loss factors of the tested panels over a range of test frequencies.

DETAILED DESCRIPTION

Figure 5:
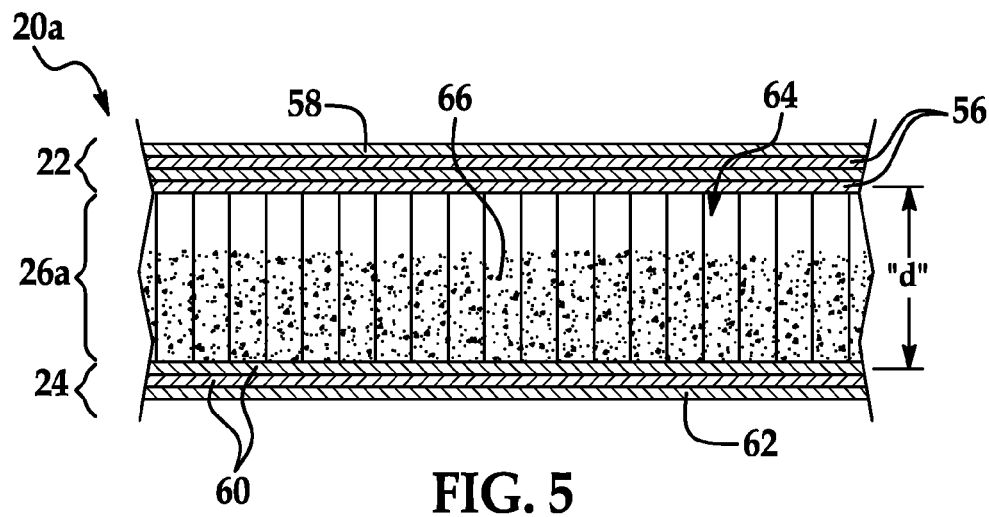
FIG. 5 is a cross sectional view of the sandwich structure shown in FIG. 4, in which individual honeycomb cells are partially filled with damping particles.

Referring first to FIG. 1, a sandwich structure 20 forming a panel comprises a core 26 sandwiched between and bonded to top and bottom skins 22, 24. One or more of the core 26 and skins 22, 24 may be formed of metal and/or composite materials. The core 26 includes a cavity 28 at least partially filled with a damping material 30 which functions to dissipate vibrational energy transmitted through the sandwich structure 20 from any of a variety of sources.

The sandwich structure 20 shown in FIG. 1 may be employed to form a variety of components and structures used in the wide range of applications where it is desirable to reduce the transmission of noise and vibration over a wide range of frequencies and ambient conditions. For example, as shown in FIG. 2 the sandwich structure 20 shown in FIG. 1 may be shaped to form a wing-to-body fairing 32 which covers the juncture between wings 34 and a fuselage body 38 of an aircraft 40. The fairing 32 may be attached to the fuselage body 38 by fasteners 42. The wing-to-body fairing 32 having integrated vibration damping provided by the sandwich structure 20 reduces noise and vibration that may be transmitted from the fairing 32 to one or more cabins (not shown) inside the body 38.

FIG. 3 illustrates additional components of the aircraft 40 shown in FIG. 2 that may advantageously utilize the sandwich structure 20 (FIG. 1) for reducing the transmission of noise and vibration through the cabin 44 of the aircraft 40. For example, the sandwich structure 20 may be employed in walls 46, ceilings 48, floors 50, bulkheads 52 and doors 54 of the cabin 44.

Referring now to FIG. 4, in one embodiment, the sandwich structure 20 may include a honeycomb core 26a formed of any of a variety of materials, including, for example and without limitation, aluminum, Nomex®, metal, cotton, paper, a composite or other types of materials. The honeycomb core 26a includes a plurality of open honeycomb cells 64, which in the illustrated embodiment, are hexagonal in cross section. While hexagonal cells 64 are illustrated in the disclosed embodiment, the honeycomb core 26a may comprise any of various sizes, shapes, materials configurations and orientations.

The top skin 22 may comprise multiple plies 56 of a fiber reinforced polymer, such as carbon fiber epoxy in which the fibers may have any of various orientations in order to provide the skin 22 with the desired rigidity and strength. The top skin 22 further includes an outer facesheet 58 which may also be formed of a fiber reinforced polymer such as carbon fiber epoxy. The top skin 22, however, may be formed of a variety of other materials or combinations of differing material, including metal such as, without limitation, aluminum.

Similarly, the bottom skin 24 may comprise multiple plies 60 of a fiber reinforced polymer, such as carbon fiber epoxy, which are covered by a facesheet 62 that may be the same or different from the facesheet 58. The skins 22, 24 may be bonded to the honeycomb core 26 using a suitable adhesive (not shown) in order to form a substantially rigid, lightweight high strength structure that may be formed into a variety of shapes, including the fairing 32 shown in FIG. 2.

Referring now to FIG. 5, according to one disclosed embodiment 20a, the open honeycomb cells 64 form a plurality of cavities 28 (FIG. 1) which may be partially filled with individual vibration damping particles 66. The particles 66 comprise separate particles which are free to move within the cells 64 and may be metallic and/or nonmetallic or a mixture thereof. For example, metallic particles may be iron, steel, lead, zinc, magnesium, copper, aluminum, tungsten or nickel. Nonmetallic particles may be ceramic, such as zirconium oxide, carbon, silicon-nitride, silicon based hollow materials preferably in the form of micro-balloons, viscoelastic or rubber-like materials. In one embodiment, the particles 66 may comprise one or more of volcanic ash, plastic, perlite, sodium-potassium and aluminum-silicate. The particles 66 may be sprayed or blown into the cells 64 during the fabrication process. Alternatively, the cells 64 may be completely filled with particles 66, following which a stream of air may be used to blow out particles 66 until a desired particle depth has been reached.

The size of each of the particles 66 may be in the range of approximately 1 to 300 microns. Generally, the cells 64 may be only partially filled with the particles, however in other embodiments, it may be possible to nearly fill the cells 64 with the particles 66. Generally, however, acceptable vibration damping may be achieved wherein approximately 60 to 90 percent of the volume of the cells 64 is filled with the particles 66. In one embodiment, 70 to 80 percent of the cells 64 may be filled with particles 66 to provide the desired results. In other embodiments, it may be possible to employ a liquid (not shown) in the place of the particles 66 to achieve vibration damping at very low frequencies, while relatively small and light solid particles 66 may provide better vibration damping results at relatively high frequencies. Additional details of suitable particles 66 for use in the disclosed embodiments may be found in U.S. patent application Ser. No. 10/795,707 filed Mar. 8, 2004 and published as US 2005/0194210 A1 on Sep. 8, 2005.

The damping particles 66 dissipate vibrational energy within the sandwich structure 20a through a phenomena sometimes referred to as non-obstructive particle damping (NOPD), in which several small holes or cavities in a vibrating structure at appropriate locations in the main load path are filled with particles or powder to appropriate levels. The particles produce a damping effect for a specific vibrational mode or modes. NOPD is a form of damping in which particles of various materials collide with both one another and with a structure in which the particles are contained, exchanging momentum and converting vibration energy to heat via friction between the particles. Thus, vibrational energy dissipation occurs due to both frictional losses and inelastic particle-to-particle collision.

Figure 6:
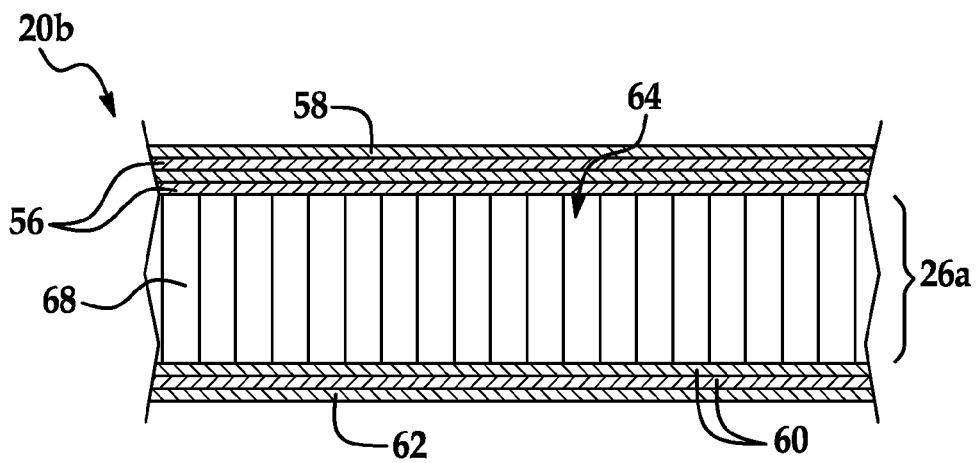
FIG. 6 is a view similar to FIG. 5, but illustrating the cells having been partially filled with a damping foam.

Referring now to FIG. 6, in another exemplary embodiment 20b, the cavity defined by the cells 64 may be at least partially filled with a damping foam 68. The foam 68 may have a density between approximately 5 and 9 pounds per cubic foot and may have a hardness in the range of approximately 0.03 to 0.12 inches. The damping foam 68 may comprise, for example and without limitation a foam designated by the trade name XP-2190 available from L&L Products, Inc. in Romeo, Mich. XP-2190 is a thermally expanded foam that may be inserted into the honeycomb core 26a and which exhibits good transmission loss performance, especially in the frequency range between approximately 600 and 2,000 Hz, where core shear deformation may be the dominant wave propagation mechanism. Generally, the damping foam 68 may fill approximately 60 to 90 percent of the volume of the cells 64, however it may be possible to completely fill the cells 64 with foam 68, depending on other construction details of the sandwich structure 20b.

Figure 7:
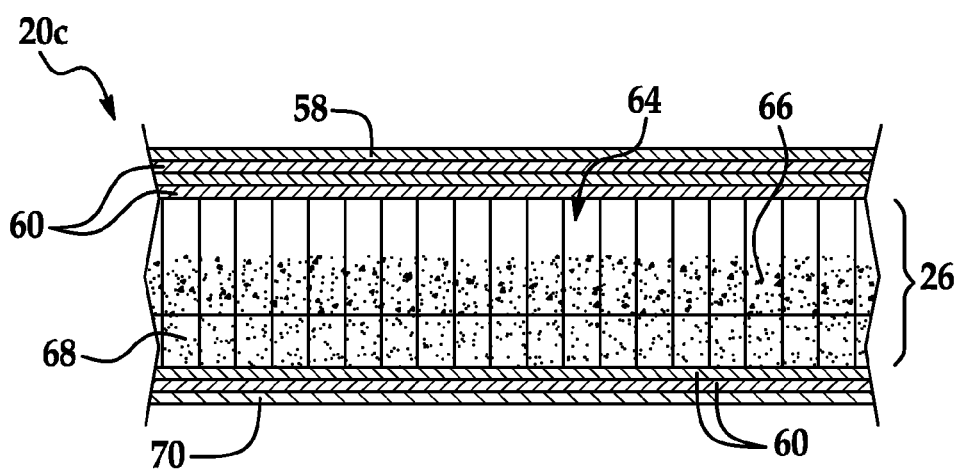
FIG. 7 is a view similar to FIGS. 5 and 6, but illustrating use of a combination of both damping particles and damping foam, along with an optional damping facesheet for reducing vibration.

Attention is now directed to FIG. 7 which illustrates a further embodiment of a sandwich structure 20c in which both damping particles 56 and a damping foam 68, similar to those previously described, are used to at least partially fill the cells 64 of the honeycomb core 26a. The foam 68 fills the lower part of the cells 64 and provides a base for supporting the individual damping particles 66 in each of the cells 64. The damping particles 66 are freely moveable within the volume of space 64 above the layer of damping foam 68.

FIG. 7 further illustrates the use of an optional damping facesheet 70 which may include an impregnating damping material, such as a highly damped epoxy resin. The epoxy resin may be, for example and without limitation, a low temperature cure epoxy resin such as Duralco Superflex Epoxy Resin 4538N available from Cotronic Corp in Brookyln, N.Y. The damping facesheet 70 may comprise, for example and without limitation, a cloth sheet that is impregnated with the damping resin mentioned above. The damping resin used in the damping facesheet 70 provides the facesheet 70 with a degree of flexibility which, when used with a more rigid upper facesheet 58, provides attenuation of vibration transmitted through the sandwich structure 20c. The combination of a relatively rigid upper facesheet 58, and a more flexible lower facesheet 70 containing a damping resin may be used in combination with the embodiments shown in FIGS. 5 and 6. Additional construction details of the damping facesheet 70 may be found in U.S. Pat. No. 7,419,031.

Figure 8:
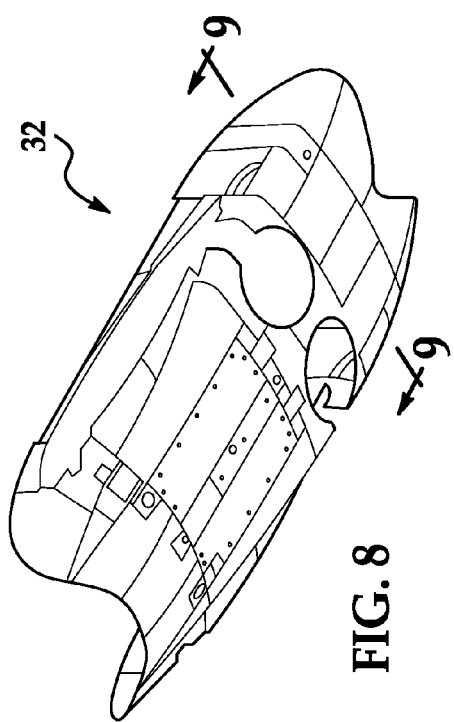
FIG. 8 Is a perspective bottom view of the fairing shown on the aircraft illustrated in FIG. 2.
Figure 9:
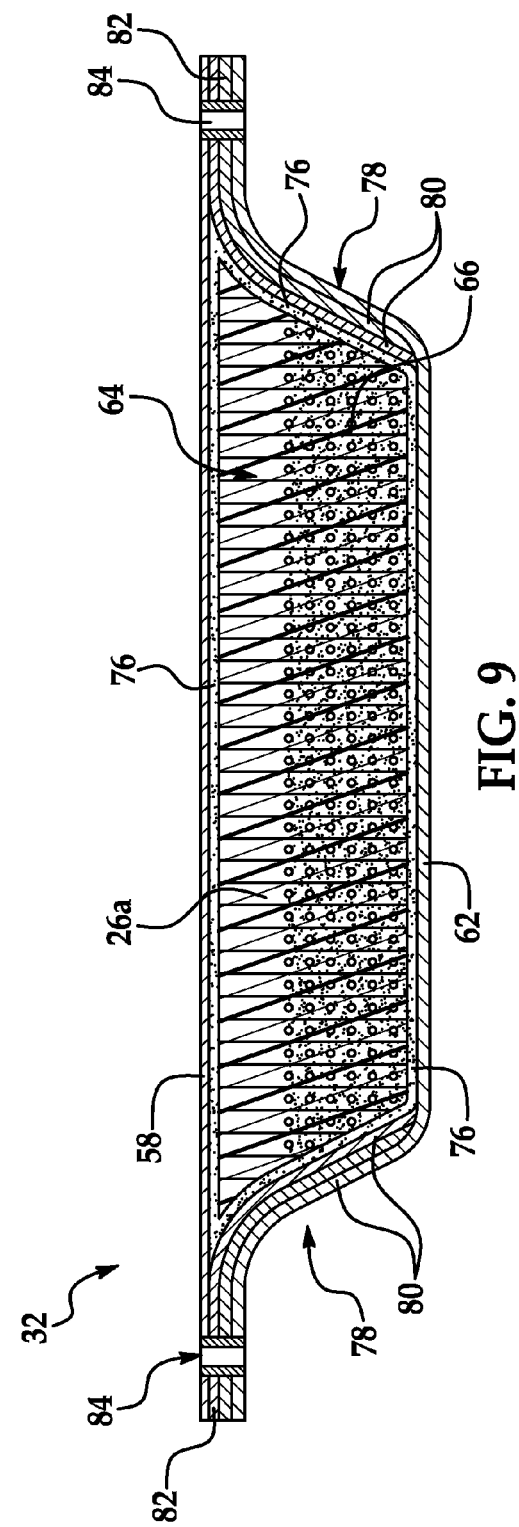
FIG. 9 is a sectional view taken along the line 9-9 in FIG. 8.

Attention is now directed to FIGS. 8 and 9 which illustrate further details of a wing-to-body aircraft fairing 32, similar to that shown in FIG. 2. The fairing 32 may be fabricated using any of the sandwich structures 20a-20c previously discussed which integrate damping features that may absorb and attenuate vibrations in the fairing 32 which could be transmitted to the body 38 of the aircraft 40 (FIG. 2) resulting in cabin noise.

The fairing 32 broadly comprises inner and outer skins 58, 62, respectively between which there is sandwiched a honeycomb structural core 26a having open cells 64 that are partially filled with damping particles 66, similar to the sandwich structure 20a previously discussed in connection with FIG. 5. Each of the skins 58, 62 may comprise one or more plies of a reinforced polymer, such as a carbon fiber reinforced epoxy. The outer skin 62 wraps around the sides 78 of the core 26a, and form, together with the inner skin 58, outer flanges 82 that are provided with bushing inserts 84 that receive fasteners (not shown) for mounting the fairing 32 on the body 38 of the aircraft 40 (FIG. 2). One or more plies 80 between the core 26a and the outer skin 62 may be provided to reinforce the sides 78 and flanges 82.

A layer of structural adhesive 76 surrounds the core 26a and bonds the latter to the skins 58, 62. In lieu of the particles 66, the fairing 32 may use the sandwich structure 20b shown in FIG. 6 having integrated damping foam 68, or the sandwich structure 20c shown in FIG. 7 which utilizes the combination of the damping particles 66 and damping foam 68. Moreover, either of the skins 58, 62 may incorporate the damping facesheet 70 shown in FIG. 7 in order to enhance the damping properties of the fairing 32.

The exact dimensions, sizes, shapes and materials used in the sandwich structures 20a-20c previously described will depend upon the requirements of the particular application. For example, in the applications where the mass of the sandwich structure 20a is to be minimized, lighter weight particles 66 may be employed, rather than heavier particles such as those formed of metal.

Referring now to FIG. 10, in order to evaluate the vibration damping benefits of the sandwich structures 20a-20c previously described, testing was carried out on a group of nine flat sandwich panels each measuring approximately sixty inches by sixty inches. The matrix 86 shown in FIG. 11 describes characteristics of the nine panels used in the tests. Identical tests on each of the panels were as performed in a series of test sequences 88. Column 92 provides a description of variations of the test panels relative to the baseline panel 4 in test sequence 1, while column 94 provides a graphical cross sectional illustration of the panel. Column 96 shows the depth of the core in the panel, and column 98 lists the weight per surface density. The variations from the baseline panel 4 described in 92 are defined in the following key:

1× foam: 1 layer of foam, inserted into the core, occupying approximately 60 percent of the 1× core depth after curing.
  2× foam: 2 layers of foam, occupying approximately 60 percent of the 2× core depth after curing.
  2× core: 2 times the baseline core depth.
  1× particle damper: approximately 60 percent of the 1× core filled with damping particles.
  2× particle damper: approximately 60 percent of the 2× core filled with damping particles.

Figure 11:
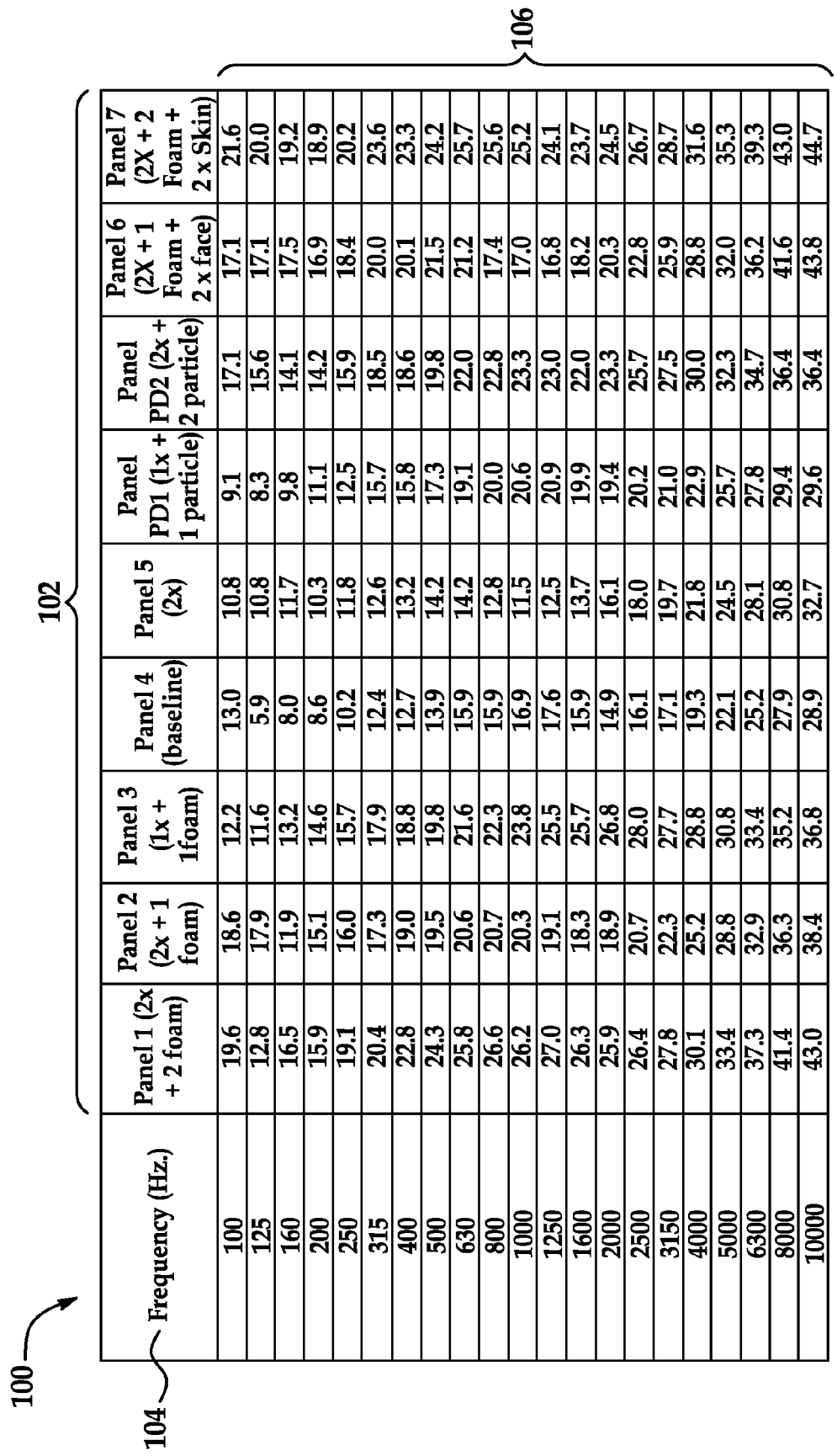
FIG. 11 is a table illustrating the results of tests performed on the panels listed in FIG. 11, showing the transmission loss over a range of test frequencies.

Testing was performed on all nine panels to determine both transmission loss (TL) and damping loss factor (DLF) as a function of frequency. The results of the TL tests are listed in table 100 shown in FIG. 11, and the results of the DLF tests are listed in table 108 shown in FIG. 12. In FIG. 11, the transmission loss TL 106 is listed for a series of frequencies between 100 and 10,000 Hz 104 for each of the panels shown in columns 102. Similarly, as shown in FIG. 12, the dampening loss factor DLF 112 is given for a series of center frequencies 110 between 250 and 8,000 Hz for each of the panels shown in columns 102.

The test results displayed in FIGS. 11 and 12 indicate that the use of the dampening foam 68 (FIG. 6) provides effective vibration damping represented by good transmission loss performance, particularly in the frequency range between 600 to 2,000 Hz where shear deformation was the dominant wave propagation mechanism. The use of dampening particles 66 also provided good vibration damping illustrated by improved transmission loss performance compared to the baseline panel 4. It was also found that increasing the depth of the core 26a had a somewhat adverse impact on transmission loss performance. Increasing facesheet thickness was found to improve transmission loss performance but moved the coincidence plateau of the panel lower, centered at 1600 Hz, resulting in a reduction of the transmission loss. The use of damping particles was found to provide significantly higher damping loss factor compared to the baseline panel 4, in the frequency range between 500 and 1,600 Hz.

Figure 13:
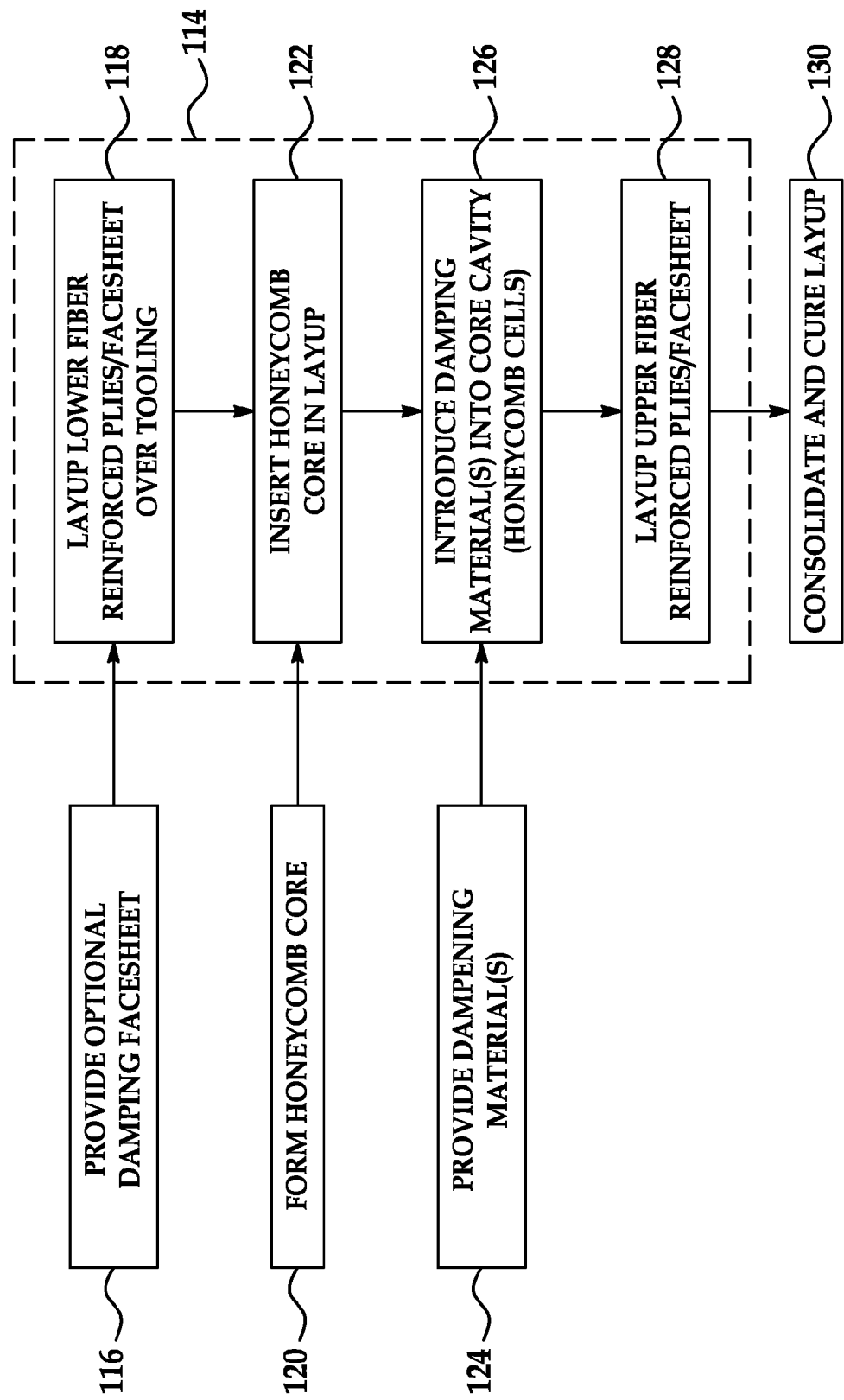
FIG. 13 is a flow diagram illustrating the steps of a method of fabricating a sandwich structure having integrated vibration damping.

Attention is now directed to FIG. 13 which illustrates the overall steps of a method of fabricating a sandwich structure 20 having integrated vibration damping suitable for use as a fairing 32 (FIG. 2). A layup procedure 114 is commenced by laying up lower fiber reinforced composite plies including a facesheet over a set of tooling, as shown at step 118. When desired, an optional damping facesheet 70 FIG. 7) may be provided at 116 for use in laying up the lower plies at 118. A suitable honeycomb core is formed at 120 which is then inserted into the layup at step 122. Damping materials, including any of the previously discussed damping particles 66 and damping foam 68 are provided at 124. The dampening materials are introduced into the core cavity which may comprise honeycomb cells, at step 126. At 128, the upper composite plies and facesheet are laid up over the honeycomb core to complete the layup process 114. The layup is then consolidated and cured at 130.

Figure 14:
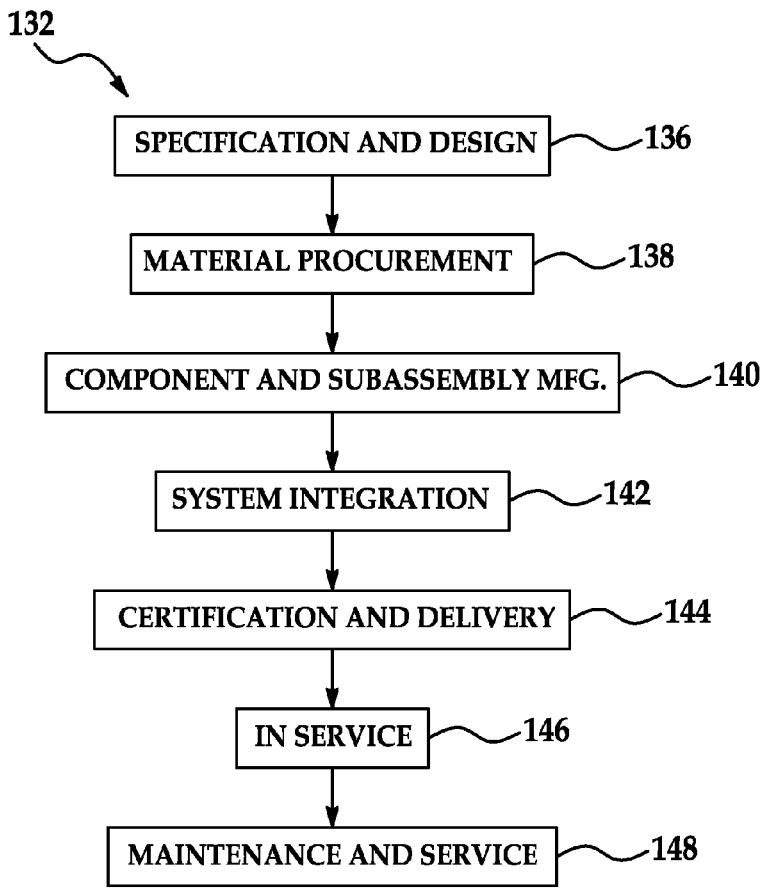
FIG. 14 is a flow diagram of aircraft production and service methodology.
Figure 15:
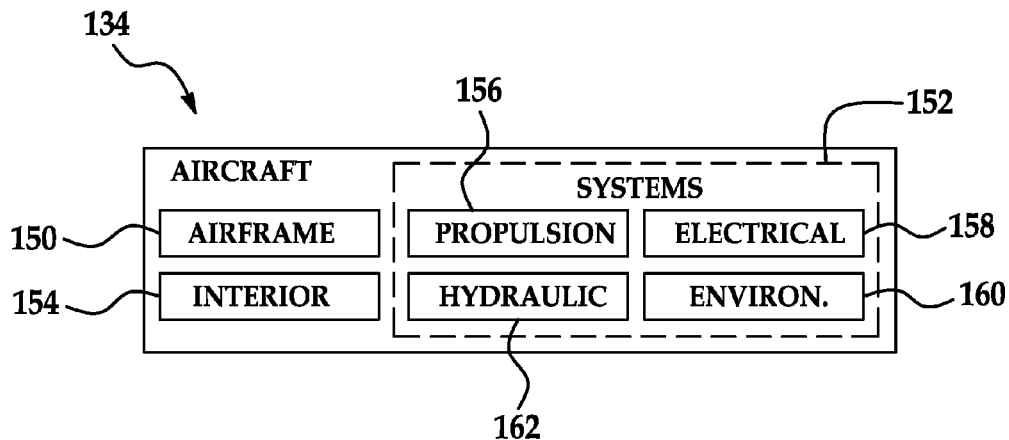
FIG. 15 is a block diagram of an aircraft.

Embodiments of the disclosure may find use in a variety of potential applications, particularly in the transportation industry, including aerospace, marine and automotive applications. For example, embodiments of the disclosure may be described in the context of an aircraft manufacturing and service method 132 as shown in FIG. 14 and an aircraft 134 as shown in FIG. 15. During pre-production, exemplary method 132 may include specification and design 136 of the aircraft 134 and material procurement 138. During production, component and subassembly manufacturing 140 and system integration 142 of the aircraft 134 takes place. Thereafter, the aircraft 134 may go through certification and delivery 144 in order to be placed in service 146. While in service by a customer, the aircraft 134 is scheduled for routine maintenance and service 148 (which may also include modification, reconfiguration, refurbishment, and so on).

Each of the processes of method 132 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 134 produced by the exemplary method 132 may include an airframe 150 with a plurality of systems 152 and an interior 154. Examples of high-level systems 152 include one or more of a propulsion system 156, an electrical system 158, a hydraulic system 162, and an environmental system 160. Any number of other systems may be included.

Apparatus and methods embodied herein may be employed during any one or more of the stages of the production and service method 132. For example, components or subassemblies corresponding to production process 268 may be fabricated or manufactured in a manner similar to components or subassemblies produced while the aircraft 134 is in service. Also, one or more apparatus embodiments, method embodiments, or a combination thereof may be utilized during the production stages 140 and 142, for example, by substantially expediting assembly of or reducing the cost of an aircraft 134. Similarly, one or more apparatus embodiments, method embodiments, or a combination thereof may be utilized while the aircraft 134 is in service, for example and without limitation, to maintenance and service 148.

Although the embodiments of this disclosure have been described with respect to certain exemplary embodiments, it is to be understood that the specific embodiments are for purposes of illustration and not limitation, as other variations will occur to those of skill in the art.

What is claimed:

1. A vibration damped aircraft fairing, comprising:
   first and second skins;
   a honeycomb core sandwiched between the first and second skins and having cells defining a plurality of cavities within the core; and,
   a vibration damping filler in the cells for damping vibrations in the fairing, the filler comprising a foam and a plurality of individual particles, the filler movable when vibrated to dissipate vibrational energy within the fairing.

2. The aircraft fairing of claim 1, wherein the filler fills approximately 60 to 90 percent of the volume of the cells.

3. The aircraft fairing of claim 1, wherein each of the first and second skins are composite laminates.

4. The aircraft fairing of claim 3, wherein the second skin includes a face sheet impregnated with a highly damped epoxy resin, the face sheet more flexible than the second skin.

5. The aircraft fairing of claim 1, wherein the individual particles include at least one of:
   volcanic ash,
   plastic,
   perlite,
   sodium-potassium, and
   aluminum-silicate.

6. The aircraft fairing of claim 1, wherein the foam has a density between approximately 5 and 9 pounds per cubic feet.

7. The aircraft fairing of claim 1, wherein the individual particles each has a size in a range of approximately 1 to 300 microns.

8. The aircraft fairing of claim 1, wherein the honeycomb core is formed from at least one of:
   aluminum,
   Nomex®,
   metal,
   cotton, and
   a composite.

9. The aircraft fairing of claim 1, wherein the panel is configured to form a win-to-body fairing.

10. A method of reducing noise in an aircraft cabin caused by vibration of a wing-to-body fairing on the aircraft, comprising:
    providing a cavity within the fairing; and
    introducing a vibration damping filler into the cavity for dissipating vibration energy in the fairing so as to partially fill the cells of the honeycomb with a vibration damping foam and a plurality of individual damping particles.

11. The method of claim 10, wherein:
    providing a cavity within the fairing includes sandwiching an open cell honeycomb between two skins.

12. The method of claim 10, wherein partially filling the cells includes filling approximately 60 to 90 percent of the volume of the cells.

13. A wing-to-body aircraft fairing having vibrations reduced by the method of claim 10.

14. A vibration damped wing-to-aircraft aircraft fairing, comprising:
    first and second laminated composite skins, one of the skins including a face sheet impregnated with a highly damped epoxy resin, the face sheet more flexible than the one of the skins;
    a honeycomb core sandwiched between and bonded to the first and second skins and including a plurality of open cells;
    a damping foam partially filling the cells and having a density between approximately 5 and 9 pounds per cubic feet; and,
    a plurality of individual damping particles movable within and partially filling the cells,
    the particle each having a size between approximately 1 and 300 microns, and including at least one of volcanic ash, plastic, perlite, sodium-potassium, and aluminum-silicate, the foam and the particles filling between approximately 60 to 90 percent of the volume of the cells.

15. A method of fabricating a wing-to-body aircraft fairing having reduced vibration, comprising:
 laying up a composite panel, including sandwiching an open cell honeycomb core between two composite laminate skins and impregnating one of the skins with a high damping resin;
 partially filling the cells of the core with vibration damping foam;
 partially filling the cells of the core with vibration damping particles;
 bonding the core to the skins;
 forming the layup over tooling into the shape of a fairing; and, curing the formed layup.

16. The aircraft fairing of claim 1, wherein at least one skin comprises carbon fiber.

17. The aircraft fairing of claim 1, wherein the honeycomb core comprises substantially hexagonal cells.

18. The aircraft fairing of claim 1, wherein the particles comprise metallic particles selected from one of iron, steel, lead, zinc, magnesium, copper, aluminum, tungsten, or nickel.

19. The vibration damped wing-to-aircraft aircraft fairing of claim 14, wherein at least one composite skin comprises carbon fiber.

20. The method of claim 11, wherein at least one skin comprises carbon fiber.

21. The method of claim 11 further comprising positioning a face sheet proximate at least one skin, the face sheet more flexible than the skin.

22. The method of claim 15 further comprising positioning a face sheet proximate at least one of the laminate skins, the face sheet more flexible than the at least one of the laminate skins.

* * * * *